United States Patent [19]

Kusakabe

[11] Patent Number: 4,979,410
[45] Date of Patent: Dec. 25, 1990

[54] REVERSIBLY ROTATING TUBE CUTTING APPARATUS AND METHOD

[75] Inventor: Yukio Kusakabe, Kobe, Japan

[73] Assignee: Kusakabe Electric & Machinery Co., Ltd., Kobe, Japan

[21] Appl. No.: 491,958

[22] Filed: Mar. 12, 1990

[51] Int. Cl.⁵ .............................................. B23D 21/00
[52] U.S. Cl. .......................................... 83/37; 83/54; 83/319; 83/320; 83/578
[58] Field of Search ................. 83/319, 321, 917, 578, 83/54, 320, 862, 37

[56] References Cited

U.S. PATENT DOCUMENTS

| | | | |
|---|---|---|---|
| 4,108,029 | 8/1978 | Borzym | 83/54 |
| 4,542,670 | 9/1985 | Borzym | 83/295 |
| 4,637,287 | 1/1987 | Kusakabe | 83/319 |

*Primary Examiner*—Frank T. Yost
*Assistant Examiner*—John M. Husar
*Attorney, Agent, or Firm*—Baker & McKenzie

[57] ABSTRACT

The invention is embodied in a tube cutting station in a tube producing mill. The cutting station includes a rotating press assembly and an axially moving cutting assembly. The cutting assembly is accelerated axially to a velocity which matches that of the tubing being produced. Once the cutting assembly reaches the same velocity as the tubing line, the press assembly can cause downward movement of a cutting blade through the tubing. The press assembly of the present invention is alternately rotated in opposite directions to maximize the rotational extent and time available for acceleration and deceleration of the press assembly, and therefore enables the use of lightweight drive motors. Slower acceleration and deceleration also reduces wear on components used to drive and stop the press assembly.

8 Claims, 1 Drawing Sheet

REVERSIBLY ROTATING TUBE CUTTING APPARATUS AND METHOD

BACKGROUND AND SUMMARY OF THE INVENTION

The present invention relates to a tube cutting apparatus for use in a continuous tube manufacturing plant, wherein a coiled strip is made into a continuous tube. In such plants, tubing is cut by a traveling cutting apparatus into desired lengths.

Such apparatuses are known, for example, from U.S. Pat. Nos. 4,149,438, and 4,637,287, the latter of which is assigned to the assignee of the present invention. In such machines, and other generally similar machines, a rotating press assembly is used to actuate a cutting assembly which includes a cutting blade. A crankshaft associated with the press assembly generates a cranking force which is distributed over a ram along which the cutting assembly slides. In general, forceful rotation of the crankshaft is in a single, or forward, direction. By limiting the forceful rotation of the crankshaft to only one direction, the angular extent during which the crankshaft can be accelerated to the proper cutting velocity is restricted. As a result, the rate of acceleration of the crankshaft is substantially larger than it would be if the crankshaft were forcefully rotatable in both a forward and reverse direction. By allowing forceful rotation of the crankshaft in forward and reverse directions, the rate of acceleration of the crankshaft can be reduced. As a result, the size of the motor used to accelerate the crankshaft can be reduced. Alternatively, if the size and power rating of the motor is maintained at the same level, by providing both forward and reverse rotation, the life of the motors and associated driving and stopping equipment can be prolonged.

It is therefore an object of the present invention to provide a tube cutting apparatus with improved efficiency.

It is another object of the present invention to provide a tube cutting apparatus which employs smaller, less expensive motors.

Yet another object of the present invention is to provide a tube cutting apparatus which has improved service life.

Still another object of the present invention is to provide a more efficient and economical method of cutting tubing.

These and other objects of the invention are achieved with a tube cutting apparatus in which the motor which drives a rotating crankshaft can be forcefully rotated in both the forward and reverse directions. The invention, which is particularly useful in a tube manufacturing plant, continuously generates tubing in a linear direction at a substantially constant speed. An elongated ram is used to actuate a cutting assembly. The cutting assembly is accelerated to a velocity which matches that of the tubing being produced. The ram is driven by a crankshaft which rotationally accelerates the ram, causing movement of a cutting blade through the tubing. The motor which drives the crankshaft is capable of forceful acceleration of the crankshaft in both forward and reverse directions. As a result, the acceleration and deceleration rates of the crankshaft can be minimized. By reducing the acceleration and deceleration rates, smaller capacity motors and simpler controls can be utilized.

DETAILED DESCRIPTION OF THE INVENTION

Figure 1:
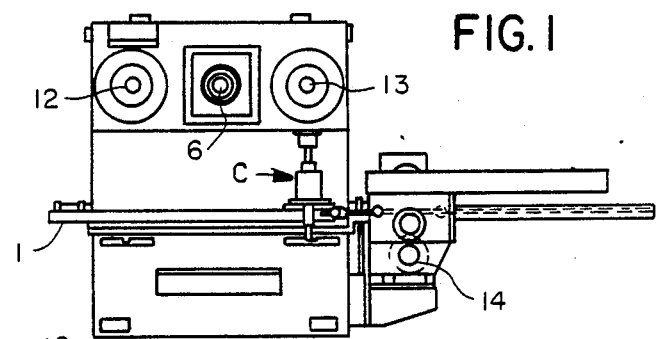
FIG. 1 is an overall front view showing a tube cutting apparatus useful in practicing the present invention.

The overall construction of a tube cutting apparatus useful in employing the present invention will be described with reference to FIGS. 1 and 2. The apparatus includes a cutting assembly C which is slidable forward and rearward on lower rails 1 fixed to a base. While the assembly travels, a cut-off blade 2 is lowered to cut a tube A which is held by clamps and die-jaws. The cut-off blade 2 is supported by an upper plate, which is slidable upward and downward relative to the clamp holders and die-jaws.

The clamp holders, die-jaws, cut-off blade 2, upper plate and associated guide devices, comprise the cutting assembly C. The bottom of the cutting assembly C is fitted to the lower rails 1, while the top thereof is fitted by holding guides 22 to upper rails of the ram 7.

The ram 7 is part of the press assembly P, which includes the central driving crankshaft 6 and the auxiliary crankshafts 12 and 13, which are followers. The press assembly P further includes the ram 7 which is moveable upward and downward by the crankshafts 6, 12 and 13. For more details regarding the construction of the ram and its synchronizing link, reference may be made to U.S. Pat. No. 4,637,287, which is incorporated herein by reference.

Figure 2:
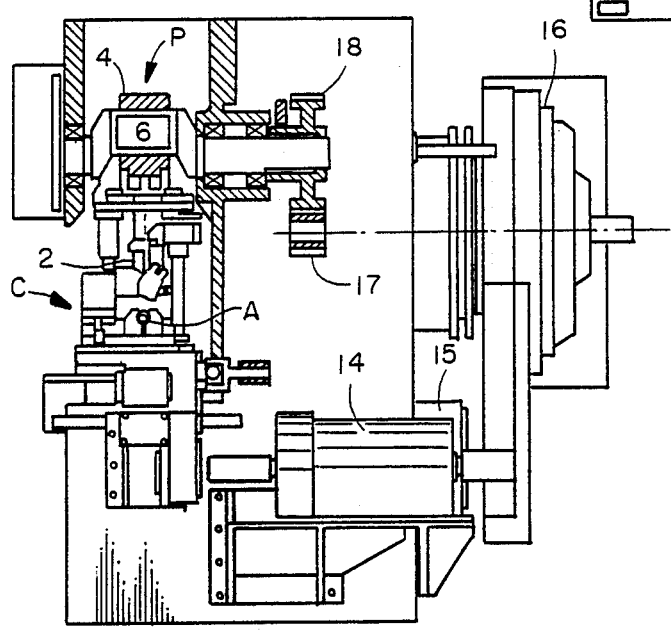
FIG. 2 is a side elevational view in partial section showing a cutting assembly, ram, and crankshaft used in practicing the present invention.

The operation of the apparatus shown in FIGS. 1 and 2 involves two simultaneous motions. The first motion is the translation of the cutting assembly C. The drive motor 14 is used to accelerate the cutting assembly to a velocity which matches that of the tubing A to be cut. The motor 14 drives the cutting assembly by means of a rack and pinion arrangement, and the cutting assembly moves in the forward or reverse direction. The second simultaneous motion is the rotation of the crankshafts 6, 12 and 13, which cause rotation of the ram 7, causing downward motion of the cutting blade C. The crankshafts 6, 12 and 13 are preferably driven by an electric motor 15.

FIG. 2 shows the motor 15 used to drive the crankshaft 6. The gear 18 is fixed to the crankshaft 6, and is driven by a pinion gear 17 which is keyed to the drive shaft 19 of the motor 15. Rotative force from the crankshaft is transferred through the ram and then to crankshafts 12 and 13, while a synchronizing link ensures that the crankshafts 12 and 13 rotate with each other and with the crankshaft 6. FIG. 2 shows a sleeve bearing 4 surrounding the crankshaft 6. The sleeve bearing 4 is attached to the ram 7. Adjacent to the shaft 19 is a safety blade 20 which stops rotation of the shaft and the press assembly in emergencies.

Whether a reversible DC motor like the one shown in FIG. 2 is used, or whether an alternative driving system is employed to operate the press assembly, such as an AC motor or combination of oppositely driven clutch and brake devices, the advantage of alternately rotating the crankshafts in the forward and reverse directions is substantial. By alternating the direction of the rotation of the ram 7, starting and stopping are less abrupt. As a result, smaller and lighter driving and stopping components may be used, because a longer rotational extent is available to accelerate and decelerate the press assembly.

Figure 3:
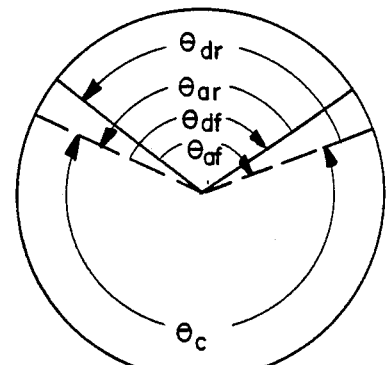
FIG. 3 is a diagram showing in schematic form the rotational movement of the crankshaft of the present invention.

FIG. 3 shows the angular extent required to achieve acceleration in the forward and reverse directions. $\theta_{af}$ corresponds to the angular extent required to accelerate the crankshafts and the ram the forward direction. Similarly, $\theta_{ar}$ shows the angular extent required to accelerate the press assembly in the rearward direction. $\theta_{df}$ and $\theta_{dr}$ show the angular extents required to decelerate the press assembly in the forward and reverse directions, respectively.

Figure 4:
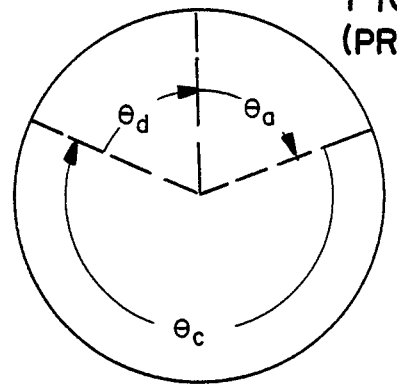
FIG. 4 is a diagram showing a schematic for the rotational movement of a crankshaft in which only a single rotational direction is used.

FIG. 4 shows the various acceleration, deceleration, and cutting angles required using only forward rotation of the press assembly. As can be seen by comparing FIGS. 3 and 4, the alternating method of the present invention provides substantially larger angular extents for the purpose of accelerating and decelerating the press assembly. By providing such larger angular extents, a substantially smaller motor can be used to accelerate the press assembly, and substantially less wear occurs on all the components involved in driving and stopping the press assembly. As can be seen from comparing FIGS. 3 and 4, the cutting angle $\theta_c$ has been kept constant for purposes of comparison. It should be noted that in cases where $\theta_c$ is larger, such as is required for larger diameter tubing, the angles $\theta_a$ and $\theta_d$ may overlap. In such cases, prior art devices required a slight backing up of the press assembly to make room for the acceleration required in the forward direction.

Figure 5:
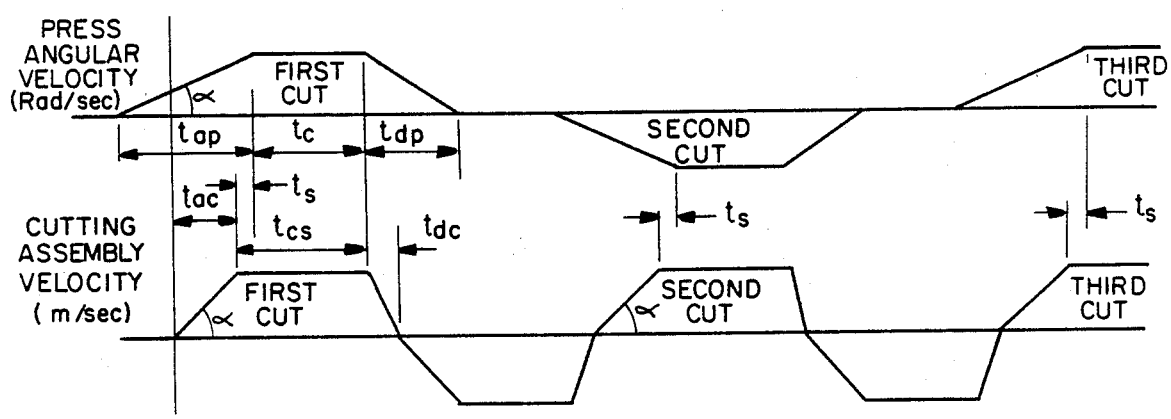
FIG. 5 shows two time related graphs describing the relationship between the angular velocity of the press assembly and the translational velocity of the cutting assembly of the present invention.

FIG. 5 shows the repeating pattern of movement of both the press assembly P and cutting assembly C, and describes both accelerations and velocities. $\gamma$ represents the acceleration rate of the press assembly P. The press assembly P accelerates to a point at which cutting begins. However, prior to the beginning of the actual cutting, as can be seen from the lower portion of FIG. 5, the cutting assembly has accelerated at a cutting assembly acceleration rate $\alpha$, to a linear velocity which matches that of the tubing A. A differential in time, $t_s$, exists between the time at which the cutting assembly has reached the tube velocity and the time at which cutting begins. As can be seen from the upper portion of FIG. 5, the angular velocity of the press assembly alternates from positive to negative to positive, etc. As can be seen from the lower portion of FIG. 5, the cutting assembly makes the first cut during the forward rotation of the press assembly, and makes the second cut during the reverse rotation of the press assembly.

In FIG. 4 the various symbols and their subscripts have the following meanings:

| | |
|---|---|
| $t_{ap} =$ | time for the press assembly to rotationally accelerate |
| $t_c =$ | cutting time |
| $t_{ac} =$ | time for cutting assembly to translationally accelerate |

-continued

| | |
|---|---|
| $t_{cs} =$ | time during which the cutting assembly and the tubing are translating synchronously |
| $t_{dc} =$ | time for cutting assembly to translationally decelerate |
| $t_{dp} =$ | time for press assembly to rotationally decelerate |
| $t_s =$ | the difference in time between the point when the cutting assembly and the tubing first starts translating synchronously and the point when cutting begins |

As can be appreciated from the upper portion of FIG. 5, the slope of the acceleration of the press assembly $\gamma$, and the corresponding deceleration slope are substantially flat, and the portion of the angular velocity curve in the positive zone extends both left and right of the portion of the cutting assembly velocity curve corresponding to the first cut. As discussed above, the advantages of a flatter, rather than a steeper, acceleration and deceleration profile enable the use of lighter weight machinery and create less wear and tear on the many components involved in the acceleration and deceleration of the press assembly.

Since the press assembly is the component of the cutting station which actually applies the force needed to cut the tubing, it is necessarily of substantial size and strength, and therefore, weight. The motor needed to drive the press assembly needs to be correspondingly large and powerful. By providing additional angular extent for purposes of accelerating the press assembly and for purposes of decelerating the press assembly, the components used in driving and stopping the press assembly can be either made smaller, or have longer service lives.

While a specific embodiment of the invention has been shown and described, it will be apparent to those skilled in the art that numerous alternatives, modifications, and variations of the embodiment shown can be made without departing from the spirit and scope of the appended claims.

I claim:

1. An apparatus for use in cutting tubing comprising:
a frame,
a cutting assembly carried by said frame,
cutting assembly drive means for moving said cutting assembly synchronously with said tubing,
a press assembly carried by said frame and coupled with said cutting assembly,
actuating means for causing rotative movement of said press assembly and actuation of said cutting assembly, said actuating means being capable of causing movement of said press assembly in alternating opposite rotative directions, with said cutting assembly being actuated on both forward and reverse rotative motions of said press assembly.

2. An apparatus for use in cutting tubing in accordance with claim 1 wherein:
said actuating means comprises a reversible motor for driving said press assembly.

3. An apparatus for use in cutting tubing in accordance with claim 2 wherein:
said motor is a reversible DC motor.

4. An apparatus for use in cutting tubing in accordance with claim 2 wherein:
said motor is a reversible AC motor.

5. An apparatus for severing a substantially continuously produced length of material, said material being produced at a predetermined velocity,
said apparatus comprising a reciprocating cutting assembly with first drive means for accelerating said cutting assembly to said velocity,
a rotatable press assembly,
second drive means for actuating said press assembly to cause movement of said cutting assembly to obtain a first cut by rotating said press assembly while said cutting assembly is at said velocity,
said second drive means being further useable to activate said press assembly cause movement of said cutting assembly to obtain a second cut,
said first and second cuts being obtained by rotation of said press assembly in opposite directions.

6. A method of cutting continuously produced tubing comprising:
moving a reciprocating cutting assembly along said tubing,
said cutting assembly having cutting means for engaging and severing said tubing,
and linearly accelerating said cutting assembly to a linear velocity which matches a line velocity of said tubing as it is produced,
rotationally actuating a rotatable press assembly in a first rotational direction to cause movement of said cutting means through said tubing,
decelerating said cutting assembly and said press assembly,
returning said cutting assembly to a starting position and again linearly accelerating said cutting assembly to a linear velocity which matches said line velocity,
rotationally actuating said press assembly in a second rotational direction to cause movement of said cutting assembly to obtain a second cut,
said first and second cuts being obtained by rotation of said press assembly in opposite directions to cause moving of said cutting means through said tubing.

7. A method in accordance with claim 6 wherein:
said press assembly undergoes alternating rotative motions, each of which actuates said cutting means to cut said tubing.

8. A method in accordance with claim 6 wherein:
said step of rotationally actuating said press assembly is achieved with a reversible electric motor.

* * * * *